Jan. 19, 1937.  E. E. HEWITT  2,068,337
TRAIN BRAKING SYSTEM
Filed Nov. 3, 1934  4 Sheets-Sheet 4

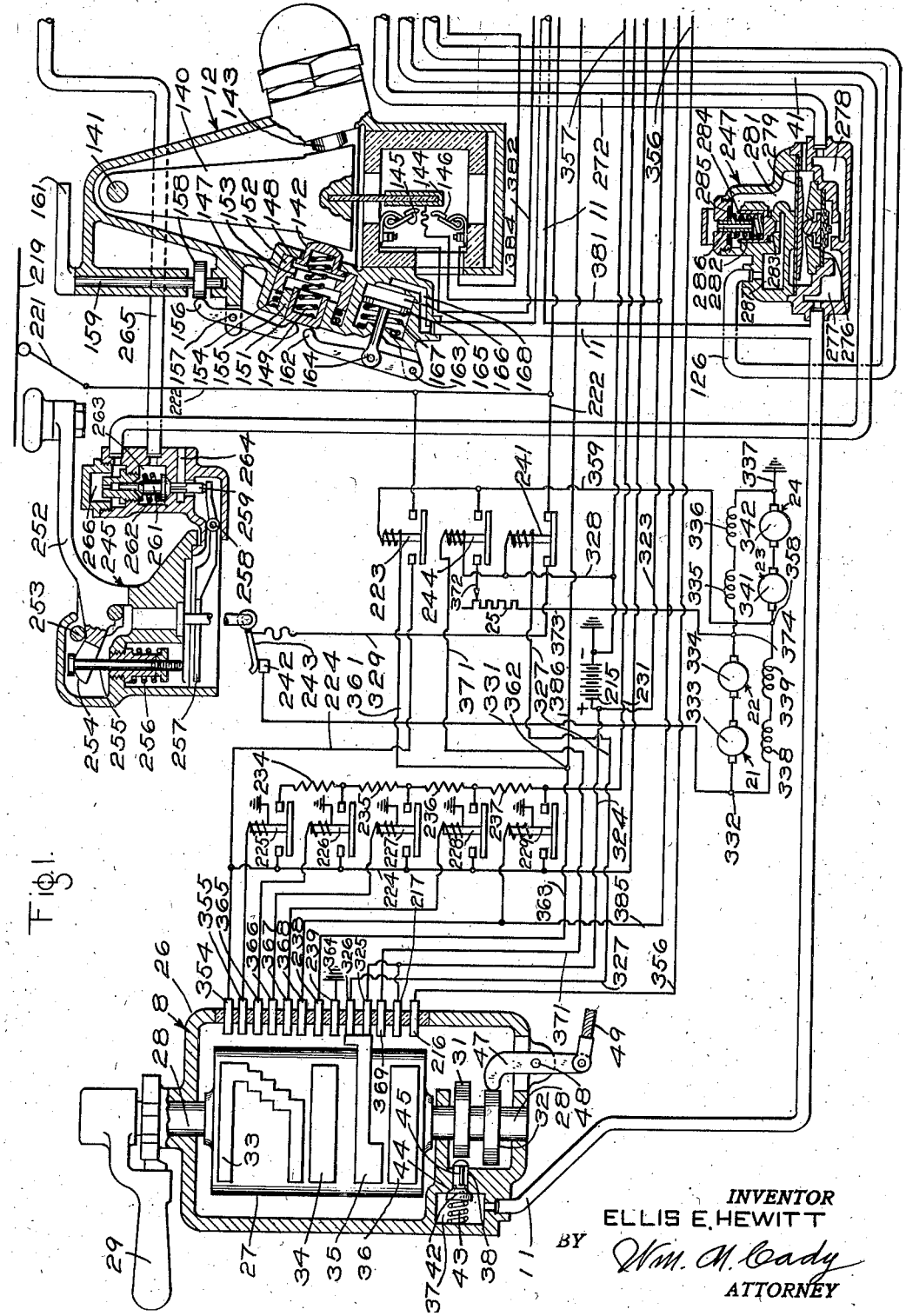

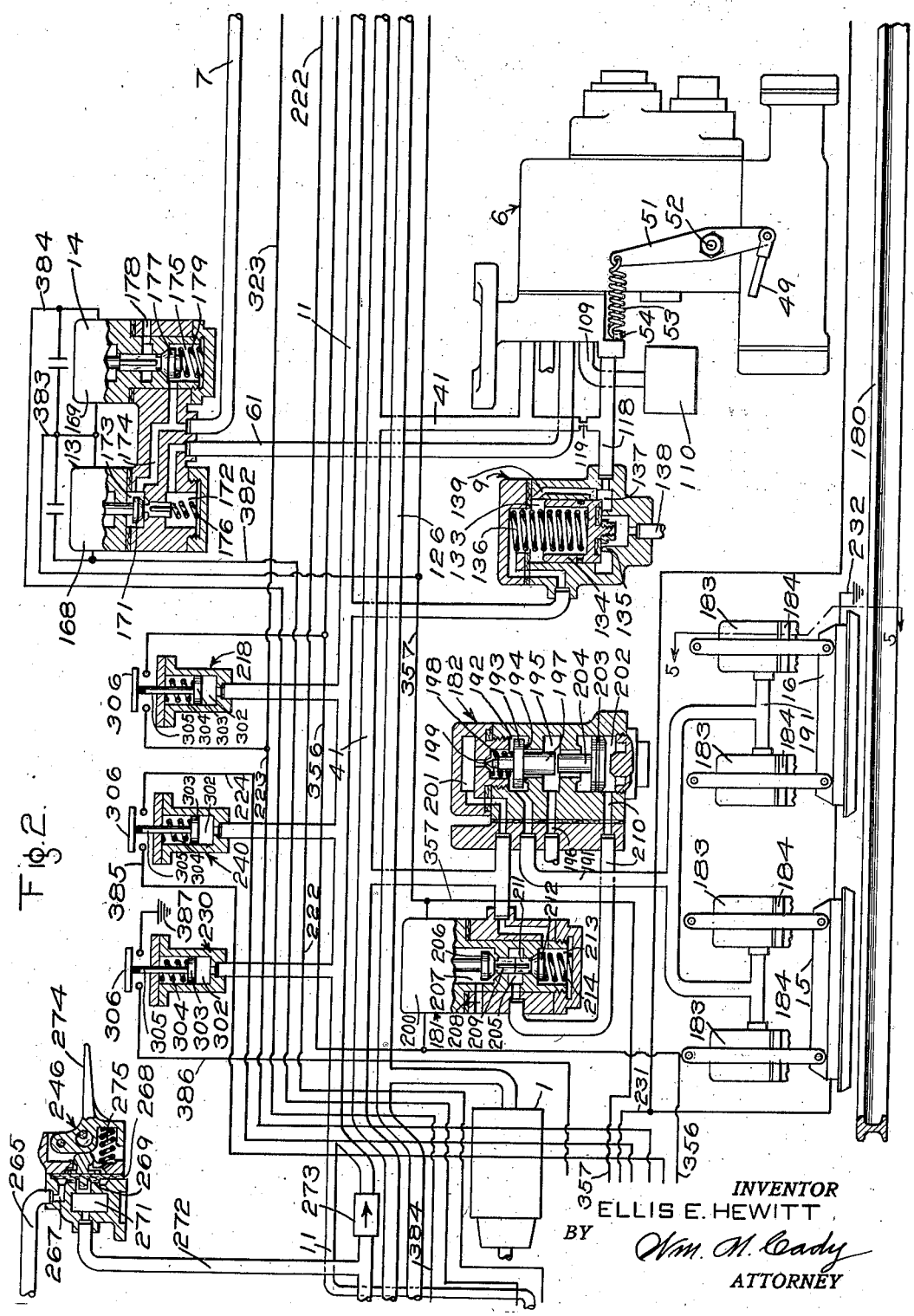

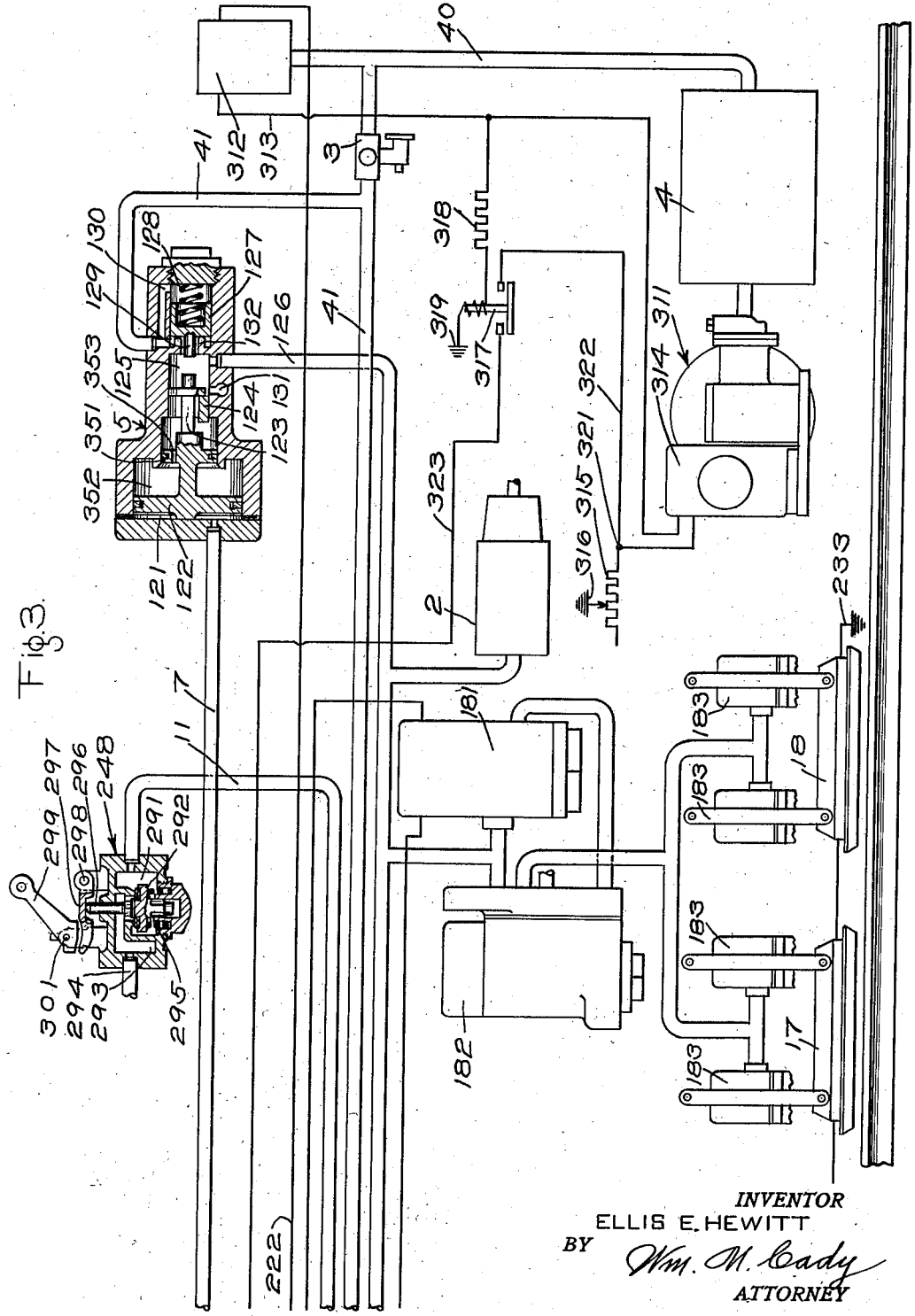

INVENTOR
ELLIS E. HEWITT
BY
Wm. M. Cady
ATTORNEY

Patented Jan. 19, 1937

2,068,337

UNITED STATES PATENT OFFICE 2,068,337

TRAIN BRAKING SYSTEM

Ellis E. Hewitt, Edgewood, Pa., assignor to The Westinghouse Air Brake Company, Wilmerding, Pa., a corporation of Pennsylvania Application November 3, 1934, Serial No. 751,340

29 Claims. (Cl. 303—3)

My invention relates to braking equipment for railway vehicles and is particularly adapted for use on high speed traction vehicles driven by electric motors.

In the operation of high speed trains and similar vehicles it is desirable to provide a brake equipment having ample braking capacity to take care of the most rigid requirements the equipment will be called upon to meet. It is well known that for a given braking pressure friction type brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at the high speeds and as the speed of the vehicle decreases to so operate the brakes as to cause the braking pressure to be decreased in such manner that the vehicle is brought to a stop quickly and smoothly without dangerous shock or skidding of the wheels.

Because of the difficulty of properly reducing the braking pressure at the desired rate it becomes desirable, in many instances, to provide a retardation controller for regulating the degree of application of the brakes. This may comprise an inertia responsive device, such as a pendulum, that assumes various positions in accordance with variations in the deceleration of the vehicle, and is adapted, by means of electric circuits or otherwise, to control the degree of application of the brakes.

A desirable type of brake equipment to use with high speed traction vehicles and railway trains is one employing both a brake for providing braking force to the wheels of a vehicle and a braking effect directly applied to the rails. The brake for applying a braking torque to the wheels of the vehicle may be the well known fluid pressure brake, an electric brake, or a combination of the two, while the track brake may be a magnetic brake controlled either by fluid pressure, electrical means, or by a combination of both means. In such an equipment a greater braking effect can be produced by operation of both the wheels and track brakes than can be obtained by operation of either of them alone.

It is an object of my invention to provide braking equipment for railway vehicles in which a plurality of braking means are provided that are controlled from a common brake controlling device in accordance with a desired degree of braking.

It is another object of my invention to provide a retardation controlled braking system in which the braking pressure is automatically controlled by a retardation controller that is manually adjusted to provide a desired degree of retardation during a service operation of the brakes, and that is automatically adjusted to provide a greater rate of retardation upon an emergency operation of the brakes.

It is a further object of my invention to provide a braking system in which an electric brake and a fluid pressure brake are employed and in which the retardation controller is employed for controlling one of said brakes in accordance with the rate of retardation of the vehicle.

It is a still further object of my invention to provide a retardation controlled braking system in which an electric braking means and a fluid pressure braking means are employed, and in which deadman devices are employed for causing application of the brakes.

It is a further object of my invention to provide a retardation controlled braking system which is provided with safety control mechanism for automatically applying the brakes to effect a rate of retardation of the vehicle to a value that is greater than normal service application of the brakes upon failure of safety control pipe pressure.

Other objects and advantages of my invention will be apparent from the following description of one preferred embodiment thereof when taken in connection with the accompanying drawings in which Figs. 1, 2 and 3, when placed end to end from left to right, together constitute a diagrammatic view illustrating circuits and apparatus comprising one preferred embodiment of my invention.

Fig. 4 is a diagrammatic sectional view of the self-lapping brake valve device shown in Fig. 2.

Fig. 5 is a sectional view taken on the line 5—5 of Fig. 2 and

Fig. 6 is a diagrammatic development of the control drum and cams of the brake controlling device illustrated in Fig. 1.

Referring to the drawings, and more particularly to Figs. 1, 2 and 3 thereof in which brake apparatus is illustrated as employed in accordance with my invention on two train units, the apparatus comprises brake cylinders 1 and 2 by means of which the brakes are applied upon the flow of fluid under pressure thereto, as supplied by a feed valve device 3, from a main reservoir 4 as controlled by a relay valve device 5 that is governed in accordance with the operation of a self-lapping brake valve device 6 for controlling the supply of fluid under pressure to and from the application and release pipe 7, either in accordance with the operation of the brake controlling device 8, or in accordance with the operation of a deadman relay valve device 9, upon a predetermined reduction in pressure in the safety control pipe 11. A retardation controller 12 is provided for controlling the degree of application of the fluid pressure brakes to limit the rate of retardation of the vehicle to a desired value by operation of the magnet valve devices 13 and 14 that are interposed between the brake valve device 6 and the relay valve device 5.

The braking equipment also includes magnetic track brake mechanism employing the track shoes 15, 16, 17 and 18 and a dynamic braking equipment wherein the vehicle driving motors 21, 22, 23 and 24 operate as electric generators for supplying current to the dynamic braking resistor 25.

The brake controlling device 8 comprises a casing 26 enclosing a contact carrying drum 27 carried on a shaft 28 provided with a handle 29 for manual operation. At the lower end of the shaft 28, cams 31 and 32 are provided for controlling the operation of the fluid pressure brake in accordance with the position of the handle 29.

The contact carrying drum 27 is provided with conducting segments 33, 34, 35 and 36. The conducting segment 36 controls the lowering and the raising of the magnetic track shoes into and out of engagement with the track rail, the conducting segment 34 controls the supply of current to the magnetic track shoe windings, and the conducting segment 33 controls the energization of the windings of the track shoe brakes in a manner to be later explained. The conducting segment 35 controls the interruption of power to the vehicle driving motors upon movement of the brake controlling handle 29 to a brake applying position, and also controls the application of the dynamic brakes.

In the lower part of the casing 26 an emergency valve chamber 37 is provided that is in constant communication with the safety control supply pipe 11 that is supplied with fluid under pressure from the main reservoir pipe 41 in a manner to be later explained. An emergency valve 42 is provided within the chamber 37 and is urged by a spring 43 to the seat 44 to close communication from the safety control pipe 11 to the atmosphere through the exhaust port 38. The emergency valve 42 is provided with a stem 45 that is adapted to be engaged by the cam 31 when the handle 29 is placed in the pneumatic emergency position to force the valve 42 from its seat 44 thus effecting communication from the pipe 11 to the atmosphere through the exhaust port 38.

A lever 47 is pivotally mounted on the pin 48 in the lower end of the casing 26, and is provided with an upper curved end for engaging the face of the cam 32, the lower end of the lever being pivotally attached to one end of a cable 49, the other end of which is attached to an operating lever 51 of the brake valve device 6, that is attached to the shaft 52 and is provided at its upper end with a spring 53, one end of which engages a lug 54 for biasing the lever 51 and the shaft 52 in a counterclockwise direction.

The brake valve device 6, best shown in Figure 4 of the drawings, may correspond to that disclosed and claimed in United States patent of Ewing K. Lynn and Rankin J. Bush for improvements in Brake valve devices, No. 2,042,112 and assigned to the same assignee as this application.

The brake valve device 6 comprises a main body portion 55, a valve portion 56, a bracket portion 57 and an emergency portion 58. The valve portion, the main body portion and the emergency portion together define a pressure chamber 59 that is in open communication, through the pipe and passage 61 and the application and release pipe 7, with the piston chamber of the relay valve 5. The magnet valve devices 13 and 14 are interposed between the pipes 61 and 7 to regulate the pressure of fluid acting on the piston of the relay valve device 5 in accordance with the rate of retardation of the vehicle.

The valve casing portion 56 is provided with a supply valve chamber 62 to which a feed valve device of the usual type supplies fluid under pressure at a reduced pressure from the main reservoir 4. A supply valve 64 is contained within the supply valve chamber 62 and is slidably disposed within the bushing sleeve 65 to engage a seat 66 carried by the valve portion of the casing. The valve 64 is subject to the pressure of a spring 67, one end of which engages the valve and the other end of which engages a nut 68 screw-threadedly attached within a bore in the valve portion of the casing.

The valve portion or section 56 of the casing is also provided with a cylinder 71 which is open at one end to the pressure chamber 59, the other end of the cylinder being closed by an adjusting member 72 screw-threadedly attached within a bore in the casing section. The adjusting member 72 is provided with a central bore 73 which at its outer end is tapped to receive a screw-threaded cap member 74.

Operatively mounted in the cylinder 71, adjacent to its open end, is a movable abutment in the form of a piston 75 having a stem 76 which is slidably guided by the adjustable member 72 within the inner end of the bore 73. At one end of the piston 75 is a chamber 77 which is constantly open to the atmosphere through passage and pipe 78. A coil spring 79 is contained in the chamber 77 and is interposed between and engages the inner face of the piston 75 and the inner face of the adjusting member 72.

A release valve chamber 80 is provided within the piston 75 and is in open communication with the pressure chamber 59 through a passage 81. A release valve 82 is contained within the valve chamber 80 and is adapted to seat on a valve seat 83 formed on the piston and which is operative to control communication between the valve chamber 80 and the chamber 77 through connecting passages 84 in the piston stem 76. The release valve is provided with a stem 85, the small end of which slides within the bore in the stem of the piston 75 and the larger end of which is provided with a collar 86 which slidably engages the piston within a central bore 87 and is subject to the pressure of the release valve spring 88 interposed between the engaging collar 86 and an annular flange 89 on the piston. Outward movement of the release valve relative to the piston 75 is limited by the collar 86 which engages a stop plate 90 that is secured to the piston 75.

A mechanism is provided for controlling the operation of the supply valve 64 and the release valve 82 comprising spaced levers 91 that are pivotally mounted intermediate their ends on a pin 92 supported in a plunger 93 that is slidably guided within a bore 94 in the casing portion 56.

The upper ends of the spaced levers 91 are connected together by a pin 95 which is loosely mounted within a roller 96 that is adapted to operatively engage the outer end of the release valve stem 85. The lower ends of the spaced levers 91 are connected together by a pin 97 on which one end of an operating rod 98 is pivotally mounted, the opposite end of the rod operatively engaging supply valve 64 within a recess 99 formed in its face.

For the purpose of operating the plunger 93 toward the right there is provided an operating lever 101 which is loosely mounted on the shaft 52 that is supported in the main casing section 55. Secured to the shaft 52 is an intermediate lever 102 provided with a lug 103 which overrides the lever 101 so that when the shaft 52 is rotated in a clockwise direction the lug 103 engages the lever 101 to cause it to move the floating pivot carrier or plunger 93 to the right. A stop 104 is provided to limit the backward movement of the lever 101.

When the shaft 52 and the lever 101 are in their release position as shown in Figure 4, the spring 67 forces the supply valve 64 to its seated position and the spring 88 forces the release valve 82 toward the left to its unseated position. It will be appreciated that the force of the release valve spring 88 is less than the force of the supply valve spring 67 which is less than the force of the regulating spring 79.

The emergency portion 56 is provided with a block 105 secured to a rod 106. One end of the rod 106 is connected to a piston 107 positioned within the piston chamber 108, through which communication is effected from the piston chamber of a sanding valve device 110 to the atmosphere through the passage 109, a choked port 111 and the exhaust passage 112, when the piston 107 is in its illustrated position. The sanding valve device 110 communicates with the pressure chamber 59, through the passage 109, when the rod 106 and block 105 are urged to the left by a spring 114. The other end of the rod 106 slidably interfits with a bore 113 in a guiding member 115.

For normally maintaining the rod 106 and the block 105 in its illustrated position, a piston 116 within a piston chamber 117 is provided, the piston chamber being connected by passage and pipe 118 and the choke 119 to the main reservoir pipe 41. So long as the pressure within the piston chamber 117 is substantially equal to the pressure within the main reservoir pipe 41 the piston 116 is urged against the piston 107 sufficiently to maintain the rod 106 and the block 105 in their illustrated position against the pressure of the spring 114.

The relay valve device 5 comprises a casing having a piston chamber 121 constantly connected to the application and release pipe 7 and containing a piston 122 which is adapted, through the medium of a stem 123, to operate a slide valve 124, that is operatively connected to the stem and contained in a valve chamber 125 that is constantly connected to the brake cylinders 1 and 2 through a brake cylinder pipe 126. Also contained in the casing is a fluid pressure supply valve 127 which is subject to the pressure of a spring 128 and which is provided with a stem 129 that is adapted to be operatively engaged by the end of the piston stem 123.

The relay valve device 5 is shown with the relay piston 122 and the slide valve 124 in their extreme left or brake releasing positions. With the slide valve 124 in this position, the valve chamber 125, and consequently, the brake cylinders 1 and 2, are connected to the atmosphere through an exhaust passage 131. With the piston 122 in release position the stem 123 will be out of engagement with the end of the supply valve stem 129 so that the pressure of the spring 128 will maintain the supply valve 127 seated against its seat rib 132, thereby maintaining communication closed from a chamber 130, that is constantly connected to the main reservoir 4 through a main reservoir pipe 41, to the valve chamber 125.

The deadman's relay valve device 9 comprises a casing having a valve chamber 133 that is in constant communication with the safety control pipe 11, and which contains a spring-weighted valve piston 134 that is urged to its seat 135 by a spring 136. A chamber 137 is provided below the valve piston 134 about the seat rib 135 that is in constant communication with the piston chamber 117 through pipe and passage 118. The chamber 137 is also connected to the chamber 133 through a restricted passage 139. The valve piston 134 is subject on its upper side to the pressure of the spring 136 and to the pressure within the chamber 133 which corresponds to that in the safety control pipe 11, and, on its under side, to the pressure within the chamber 137 which, when the valve is seated, corresponds to the pressure within the main reservoir pipe 41. Upon a decrease in pressure within the safety control pipe 11 below a predetermined amount the pressure in the chamber 137 will be sufficient to raise the valve piston 134 from its seat thus venting the piston chamber 117 in the emergency portion of the brake valve device 6 through pipe 118 and exhaust port 138 until a sufficient reduction in pressure is effected to permit the valve 134 to again seat.

The retardation controller 12 comprises a casing enclosing an inertia device or pendulum 140 that is pivotally supported on the pin 141 and positioned between the spring pressed plungers 142 and 143 that resist movement of the pendulum 140 from its vertical position, and upon the lower end of which is mounted a movable contact member 144 for engaging the fixed contact members 145 and 146 to control the magnet valve devices 13 and 14. The plunger 142 extends through an opening at the inner end of a cylindrical portion 147 of the casing structure and is provided with a flange 148 within the cylindrical portion for limiting the movement of the plunger 142 toward the pendulum. The plunger 142 is urged toward the pendulum by a spring 149, one end of which engages the plunger 142 and the other end of which terminates within a recess in, and is in engagement with the inner wall of, a cap 151 that extends through a central opening in the other end of the cylindrical portion 147 of the casing structure. A sleeve 152 is slidably mounted within the cylindrical portion 147 of the casing structure and is provided with an inwardly extending flange 153 that is adapted to be engaged by the outwardly extending flange 148 of the plunger 142. The sleeve 152 is urged inwardly by a spring 154 positioned within the cylindrical portion 147 of the casing, and about a central guide wall portion 155 between the outer end of the cylinder and the end of the sleeve 152.

Upon movement of the pendulum 140 toward the left sufficiently to urge the plunger 142 against the bias of the spring 149, until the flange 148 of the plunger 142 engages the flange 153 of the sleeve 152, the movable contact member 144 engages the contact member 145 causing energization of the winding of the magnet valve device 13. Upon the application of a sufficient greater force the pendulum 148 will urge the plunger 142 toward the left, moving the sleeve 152 against the pressure of the spring 154 until the flange 153 on the inner side thereof engages the end of the guide wall 155, which acts as a stop, and the movable contact member 144 engages the contact member 146 to energize the winding of the magnet valve device 14.

In order to provide for adjusting the force of the spring 149 against the plunger 142 a lever 156 is provided, and is pivotally supported intermediate its ends on the pin 157 carried by the casing. The lower end of the lever 156 engages the outer face of the cap 151, and the upper end of the lever 156 engages the face of a cam 158 attached to the lower end of a rod 159, that is manually adjustable by a lever 161.

In order to provide for changing the setting of the retardation controller upon a reduction in pressure in the safety control pipe 11 a lever 162, mounted on the pivot pin 163, is provided having its upper end in engagement with the outer face of the cap 151, and pivotally connected by the pin 164, at a point intermediate its ends, to a piston 165, slidably mounted within a piston chamber 166. The piston 165 is subject on one side to the force of a spring 167, and on the other side to the pressure within the piston chamber 166, which corresponds to the pressure in the safety control pipe 11. When the pressure within the safety control pipe 11, and within the piston chamber 166, is insufficient to overcome the pressure of the spring 167, it becomes effective to force the lever 162 toward the right against the bias of the spring 149, thus increasing its force.

Referring to the magnet valve devices 13 and 14 that are controlled by the retardation controller 12 and are interposed between the pipe 61 and the application and release pipe 7 the magnet valve device 13 comprises a magnet 168 operatively connected to a valve 171 for controlling communication between the chamber 172, that is constantly connected to the pressure chamber 59 of the brake valve device 6 through pipe and passage 61, and the valve chamber 173 that is in communication with the piston chamber 121 of the relay valve device 5 through passage 174 and the application and release pipe 7. A spring 176 is provided within the chamber 172 for urging the valve 171 from its seat. The release magnet valve device 14 comprises a magnet 169, operatively connected to a release valve 177 within the release valve chamber 175 connected to the passage 174, for controlling the release of fluid under pressure from the piston chamber 121 through the application and release pipe 7, the valve chamber 175, and the exhaust port 178, to the atmosphere. A spring 179 is provided within the release valve chamber 175 for urging the release valve 177 to its seat.

Mechanism is provided for operating the magnetic track shoes 15 and 16 into and out of engagement with the track rail 180, and comprises a track shoe raising magnet valve device 181, a relay valve device 182, and track shoe raising cylinders 183 are provided.

Similar mechanism is provided for operating the magnetic track shoes 17 and 18.

The magnetic track shoe cylinders 183, as best shown in Fig. 5, are attached to the car body 184 and each cylinder is provided with a piston chamber 185 containing a piston 186 having a stem 187 that is connected to supporting bracket 188 connected to the track shoe 16 by any suitable means such as the pin 189. A pipe 191 is connected to the chamber 185 below the piston 186 for supplying fluid under pressure thereto to raise the piston and the track shoe from the rail. The other end of the pipe 191 communicates with a valve chamber 192 within the relay valve device 182 containing a valve 193 that is adapted to engage the seat rib 194 to close communication between the chamber 192 and an exhaust chamber 195, that is in open communication with the atmosphere through exhaust passage 196. The valve 193 is provided with a downwardly extending stem 197 that extends through a bore in the wall separating the chambers 192 and 195. A spring 198 is provided within the chamber 192 for forcing the valve 193 downwardly against its rib seat 194. The valve 193 is provided with a bore containing a needle valve 199 in its upper end for closing communication between the valve chamber 192 and an inlet chamber 201 in the upper part of the relay valve device casing, that is in open communication with the main reservoir pipe 41.

The relay valve device 182 is also provided, in its lower end, with a piston chamber 202 containing a piston 203 provided with an upwardly extending stem 204 for engaging the lower end of the valve stem 197. The piston chamber 202 is in open communication, through passage and pipe 210, with an intermediate chamber 205 provided in the casing of the track shoe raising magnet valve device 181. The magnet valve device 181 also includes a magnet 200 operatively connected to a release valve 206 contained within a release valve chamber 207 that is in open communication with the atmosphere through exhaust port 208 for controlling communication between the piston chamber 202 and the atmosphere. The valve 206 is provided with a downwardly extending stem 209 that engages an upwardly extending stem 211 of a supply valve 212 positioned within a supply valve chamber 213, that is in open communication with the main reservoir pipe 41. A spring 214 within the valve chamber 213 urges the valve 212 to its seat, and the valve 206 from its seat.

The magnet 200 of the track shoe raising magnet valve device 181 is energized from a source of energy, such as the battery 215, to effect the lowering of the magnet track shoes into engagement with the rail, either upon engagement of the conducting segment 36 of the brake controlling device 8 with the contact members 216 and 217, or upon operation of an automatic safety control switch 218 to its circuit closing position upon a reduction in safety control pipe pressure below a predetermined amount. The circuit for energizing the magnetic track shoes extends from the overhead line conductor 219, through the trolley 221, conductor 222, track shoe line switch 223, conductor 224, one of the control relays 225, 226, 227, 228 or 229 to conductor 231, the windings of the magnetic track shoes 15 and 16 to ground at 232, and through the windings of the magnetic track shoes 17 and 18 to ground at 233. One or more of the brake controlling resistors 234, 235, 236 and 237 may be included in this circuit depending upon through which of the relays 225 to 229 inclusive the circuit is completed. The track brake line switch 223 is operated to its circuit closing position, either upon engagement of the conducting segment 34 of the brake controlling device 8 with the conducting contact members 238 and 239, or upon closing of the safety control automatic switch 230 upon a reduction in safety control pipe pressure. A safety control automatic switch 240 is also provided for operating the relay 229 to its circuit closing position upon a predetermined reduction in safety control pipe pressure thus effecting full energization of the track shoe magnet.

A line circuit breaker 241 and a power controller represented by the contact members 242 and 243 are provided for controlling the supply of power to the motors 21, 22, 23 and 24 from the trolley 221. A contactor 244 is also provided for controlling the application of the dynamic brakes.

The apparatus also includes a deadman feature which comprises a controller handle device 245 and a diaphragm foot valve device 246 for effecting an emergency application of the brakes upon a reduction of pressure in the safety control pipe 11. A cut-off valve device 247 is provided for preventing operation of the deadman feature provided the brakes have been applied sufficiently to provide a predetermined brake cylinder pressure. A conductor's valve 248 is also provided for venting the safety control pipe 11 to effect an emergency application of the brakes. A reduction in pressure in the safety control pipe 11 from any cause effects an emergency application of the pneumatic brake through operation of the deadman relay valve device 9 and the brake valve device 6, and an emergency application of the electrical track brake through operation of the automatic pressure switches 218, 230 and 240 in a manner to be later explained.

The controller handle device 245 may comprise a handle 252, fastened on the pin 253 in the controller handle train, and provided with outwardly extending bifurcated fingers 254 that engage the head of a pin 255 to move the pin upwardly as the handle 252 is pressed down, thus raising the pin 255 against the pressure of a spring 256, and bringing it out of engagement with the lever 257. The lever 257 is pivotally mounted on a pin 258 in the casing of the controller handle device and its shorter end engages a valve stem 259 that extends upwardly to a double beat pilot valve 261 that is pressed downwardly by a spring 262 in the valve chamber 263. When the pin 255 is raised from engagement with the lever 257 the spring 262 forces the pilot valve 261 to its lower seated position to close communication between an exhaust port 264 and the valve chamber 263, that is in open communication, through pipe 265, with the chamber 267 of the foot pedal device 246, and effects communication between the valve chamber 263 and a chamber 266 that is constantly connected to the main reservoir pipe 41.

The foot valve device 246 comprises a casing provided with the aforementioned chamber 267 and a valve 268 that is adapted to engage the seat rib 269 to control communication between the chamber 267 and a chamber 271 that is in open communication with a pipe 272 having two branches, one of which terminates in the check valve 273 and the other of which is connected to the cut-off valve device 247. When pressure is maintained on the foot pedal 274 the valve 268 is held in its seated position closing communication between the pipes 265 and 272. When pressure on the foot pedal 274 is released the spring 275 forces the foot pedal upwardly unseating the valve 268.

The cut-off valve device 247 is provided with a valve 276 for controlling the flow of fluid under pressure from a supply valve chamber 277, that is in open communication with the safety control pipe 11, and a chamber 278 that is in open communication with the pipe 272. The chamber 278 is in communication with the chamber 271 of the foot valve device 246 through pipe 272.

The cut-off valve device is also provided with a diaphragm 279 which is adapted to cause the valve 276 to be seated when the pressure in the chamber 281 above the diaphragm 279 exceeds that acting upon the under side of the valve 276. The pressure above the diaphragm 279 is controlled by a control valve 282 which is urged toward a lower seat 283 by a spring 284, and toward an upper seat 285 by the pressure below the valve.

When the control valve 282 is positioned against its lower seat the chamber 281, above the diaphragm 279, is in communication with the atmosphere through a passage 286 past the open upper seat 285 of the valve 282. A chamber 287, below the valve 282, is in constant communication with the brake cylinder pipe 126.

When the pressure within the chamber 287 which corresponds to brake cylinder pressure reaches a predetermined amount the control valve 282 is forced upwardly from its lower seat 283 against its upper seat 285 cutting off communication between the chamber 281 and the atmosphere and effecting the supply of fluid under pressure at brake cylinder pressure to the chamber 281. When the fluid pressure above the diaphragm 279 reaches a predetermined value the valve 276 will be seated thus closing communication between the chambers 277 and 278, thus preventing the flow of fluid under pressure from the safety control pipe 11 to the chamber 271 in the foot valve device.

A conductor's valve device 248 may comprise a casing containing a chamber 291 that is in constant communication with the safety control pipe 11. A valve 292 is contained within the chamber 291 for controlling communication between chamber 291 and chamber 293, that is connected through the exhaust port 294, to the atmosphere. The valve 292 is normally biased upwardly to its seated position by a spring 295 thus closing communication between the safety control pipe 11 and the atmosphere. A valve stem 296 extends upwardly from the valve 292 and engages a valve lever 297 pivoted on a pin 298 mounted on the valve casing. An operating lever 299 is pivotally mounted upon a pin 301 carried on a bracket extending upwardly from the valve casing and which when moved in either direction forces the valve lever 297 downwardly unseating the valve 292 and permitting fluid under pressure to be vented from the safety control pipe 11 to the atmosphere through the exhaust port 294.

Each of the automatic pressure control safety switches 230, 240 and 218 are alike in construction and comprise a casing enclosing a piston chamber 302 that is in open communication with the safety control pipe 11 and contains a piston 303 that is urged downwardly by a spring 304 above the piston. A stem 305 extends upwardly from the piston through the casing and carries a contact member 306 that is adapted to be moved to a circuit closing position upon the downward movement of the piston 303 by the spring 304 upon the release of pressure from the piston chamber 302.

In order to provide for maintaining the desired pressure within the main reservoir 4 a compressor set 311 is provided, the operation of which is controlled by a pressure responsive governor 312 that is effective upon a predetermined decrease in pressure within the main reservoir to operate a switch closing a circuit from the trolley through conductors 222 and 313, the motor 314 of the compressor set through a variable resistor 315 to ground at 316. In order to provide for charging the battery 215 when the compressor set is in operation a charging battery switch 317 is provided, the operating circuit of which is completed from conductor 313 through the resistor 318 to ground at 319, when the compressor circuit is energized. Upon closing of the battery charging switch 317 the grounded terminal 321 of the compressor motor 314 is connected through conductor 322, the contact members of the switch 317, and conductor 323 to the positive terminal of the battery 215, thus connecting the battery 215 between the terminal 321 and ground in parallel circuit relation to the resistor 315. The voltage applied to the battery 215 will therefore correspond to the voltage drop across the resistor 315, and by varying the resistor 315 the voltage impressed upon the battery 215 may be correspondingly varied.

The operation of the braking system will now be described. The various parts of the apparatus are illustrated in their brake release position, and in this position the equipment is charged by the flow of fluid under pressure from the main reservoir 4 through pipe 40 past the feed valve device 3 to the main reservoir pipe 41 at a reduced pressure. From the main reservoir pipe 41 fluid under pressure flows to the control valve chamber of the relay valve device 5. Fluid under pressure also flows from the pipe 41 through the choke 119 to the chamber 137 in the deadman relay valve device 9 and, after the pressure in the chamber 133 has built up sufficiently to maintain the valve piston 134 in its seated position, to the piston chamber 117 in the emergency portion of the brake valve device 6 forcing the pistons 116 and 107, the rod 106, and the block 105 to the right, against the bias of the spring 114. Fluid under pressure also flows from the main reservoir pipe 41 to charge the lower valve chamber 213 of the track shoe raising magnet valve device 181 and to the track shoe raising cylinders 183 through chamber 201 of the relay valve device 182, past the needle valve 199, through valve chamber 192 and pipe 191.

The safety control pipe 11 is initially charged with fluid under pressure from the main reservoir pipe 41 through chamber 266 in the controller handle device with the handle 252 in its depressed position, past pilot valve 261 in its lower position, through pipe 265, past valve 268 of the foot valve device in its unseated position, through pipe 272, and either through check valve 273 to the safety control pipe 11, or through chamber 278 of the cut-off valve device 247, past valve 276 in its unseated position, through chamber 277 to pipe 11. After pressure has built up in the safety control pipe 11 sufficiently to maintain the valve piston 134 of the deadman's relay valve device 9 seated, the safety control pipe will also be charged in part by the flow of fluid under pressure through the restricted passage 139, which is sufficient to maintain the pipe 11 charged against normal leakage when pressure on the lever 274 of the foot valve device 246 maintains the valve 268 in its seated position.

Fluid under pressure flows from the safety control pipe 11 to the piston chamber 166 in the retardation controller thus compressing the spring 167 and relieving the pressure exerted thereby through the lever 162 against the cap 151, so that the setting of the retardation controller is determined solely by the position of the handle 161. Pressure must now be maintained on the foot valve device lever 274 or on the handle 252 of the controller handle device 245 in order to prevent venting air from the safety control pipe 11 to the atmosphere, unless the brakes are applied with sufficient brake cylinder pressure, which is communicated to the chamber 281 of the cut-off valve device 247, to force the diaphragm 279 down and cause the valve 276 to seat. The piston chambers 302 of the automatic pressure switch devices 218, 230 and 240 are charged with fluid under pressure from the safety control pipe 11 thus forcing the piston 303 and the contact members 306 to their upper or illustrated positions.

With the brake controlling device 8 in its release position, a circuit is completed from the positive terminal of the battery 215 through conductor 324, contact member 325, conducting segment 35, and contact member 326 of the brake controlling device 8, conductor 327, the winding of the line circuit breaker 241, conductor 328 to the negative terminal of the battery 215, thus operating the line circuit breaker 241 to its circuit closing position. A circuit may now be completed through the motor controller, represented by the contact members 242 and 243, that extends from the overhead line conductor 219, through trolley 221, conductor 222, the line circuit breaker 241, conductor 329, the controller contact members 242 and 243, conductor 331 to a junction point 332, and from there to ground through two branch circuits, one branch circuit extending through armature windings 333 and 334, respectively, of the motors 21 and 22, and through field windings 335 and 336, respectively, of motors 23 and 24, to the grounded terminal 337, and the other branch circuit extending from the junction point 332 through field windings 338 and 339, respectively, of motors 21 and 22, and armature windings 341 and 342, respectively, of motors 23 and 24, to the grounded terminal 337. It will be noted that the motor circuit is completed through the line circuit breaker 241, and that this circuit breaker is maintained in its circuit closing position only when the brake controlling device 8 is in its brake release position, so that, upon movement of the handle 29 to any brake applying position, the circuit through the conducting segment 35 and the contact member 326 will be interrupted, causing the line circuit breaker 241 to drop to its circuit interrupting position and interrupt the flow of power to the motors 21, 22, 23 and 24, regardless of whether the controller handle device 245 has been operated to its power off position.

If the operator wishes to apply the brakes, the handle 29 of the brake controlling device 8 is moved from its release position. Upon the initial movement from release position the contact member 326 separates from the conducting segment 35 interrupting the circuit through the winding of the line circuit breaker 241, which will interrupt the motor circuit in the manner just described unless the controller handle device 245 has been placed in its "power off" position. Upon movement of the handle 29 from release position through the first pneumatic service zone of the brake equipment, to the controller position indicated by the vertical line 1 in Fig. 6, the outer face of the cam 32 on the lower portion of the shaft 28 advances against the upper end of the lever 47. The lever 47 is thus actuated in a clockwise direction about the pivot pin 48, the lower end of the lever moving the cable 49 toward the left, thus moving the lever 51, shaft 52 and the operating lever 101 in a clockwise direction and forcing the plunger 93 toward the right. The first portion of this movement effects a compression of the spring 88, and the seating of the release valve 82, closing communication between the pressure chamber 59 and the atmosphere through the passages 81, 84 and 78. Further movement of the plunger 93 toward the right causes the spaced levers 91 to pivot about their upper ends, further movement of the roller 96 being prevented by the regulating spring 79, and causes the rod 98 to force the supply valve 64 against the compression of the supply valve spring 67 to open communication between the main reservoir pipe 41 and the pressure chamber 59, through passage 41 and the supply valve chamber 62, thus supplying fluid under pressure from the main reservoir 4 through passage and pipe 61, the application and release pipe 7 to the piston chamber 121 of the relay valve device 5.

The amount of fluid under pressure supplied to the pressure chamber 59, and to the piston chamber 121 of the relay valve device 5 is dependent upon the degree of movement of the operating lever 101, and of the plunger 93, from their release positions, since, while the pressure within the chamber 59 increases due to flow of fluid thereto through the supply valve 64, a pressure is exerted on the chamber side of the piston 75 in opposition to the pressure exerted by the regulating spring 79. This pressure continues to build up until it becomes sufficient to force the piston 75 toward the right relieving the pressure on the roller 96 and permitting the supply valve spring 67 to force the rod 98 toward the left pivoting the levers 91 about the pivot pin 92 and moving the supply valve 64 into engagement with its seat 66. The amount of pressure on the chamber side of the piston 75 necessary to effect sufficient movement of the piston 75 to cause the supply valve 64 to seat is dependent upon the amount of movement of the operating lever 101 and of the plunger 93 from their release positions. The greater the movement of the operating lever 101 from its release position the greater will be the movement of the pivot pin 92 toward the right, and consequently, the greater will be the compression of the regulating spring 79 necessary to permit movement of the lever 91 and of the rod 98 to effect the seating of the supply valve 64. It will be apparent, therefore, that the brake valve device is self-lapping on a pressure basis, the degree of fluid pressure within the pressure chamber 59 necessary to effect the movement of the valve to lap position being dependent upon the degree of movement of the operating lever 101 from its release position.

Fluid under pressure thus supplied to the piston chamber 121 of the relay valve device 5 causes the relay piston 122 to move toward the left carrying the slide valve 124 with it. As the relay piston and slide valve are thus operated the slide valve laps the release port 131 closing communication from the relay slide valve chamber 125 to the atmosphere. After the port 131 is lapped the end of the piston stem 123 engages the stem 129 of the supply valve 127 and causes this valve to be unseated from its seat rib 132 against the pressure of the spring 128. With the supply valve 127 unseated fluid under pressure is supplied from the main reservoir 4 through the feed valve 3 at a reduced pressure, through the main reservoir pipe 41, valve chamber 130, past the unseated valve 127 through slide valve chamber 125 and brake cylinder pipe 126 to the brake cylinders 1 and 2.

With the relay and valve in this position a force is exerted to move the piston 122 and the valve 124 away from the supply valve 127 that consists of the pressure within the slide valve chamber 125 plus the pressure of the spring 128. The pressure within the slide valve chamber 125 is not immediately effective against the rear of the piston 122 because of the provision of a phantom piston 351 between which and the piston 122 a chamber 352 is provided connected to the slide valve chamber 125 through a restricted opening 353. Upon an increase or decrease in pressure within the slide valve chamber 125 the flow of fluid under pressure through the opening 353 between the chambers 352 and 125 causes the pressure within the chamber 352 to become equal to that within the valve chamber 125 after a slight time interval. When the pressure in the chamber 352 builds up to substantially the pressure on the face of the piston 122, as supplied through the application and release pipe 7, the piston is moved away from the supply valve 127 sufficiently to permit it to seat and cut off communication between the main reservoir pipe 41 and the brake cylinders 1 and 2. When the supply valve 127 seats the spring 128 no longer is effective to force the valve stem 129 against the piston stem 123 so that the piston 122 and slide valve 124 do not move further or sufficiently to unlap the release port 131. Fluid under pressure is therefore retained in the valve chamber 125 and in the brake cylinders 1 and 2 that is substantially equal to the pressure in the application and release pipe 7.

If the operator now wishes to release the brakes the brake controller handle 29 is moved to its release position thus operating the cam 32 to relieve the pressure against the upper end of the lever 47 which is forced toward the left by the spring 53 on the brake valve device 6 operating through the lever 51 and the cable 49. This movement rotates the shaft 52 in a counterclockwise direction and relieves the pressure of the operating lever 101 against the end of the movable plunger 93 which is forced toward the left by the supply valve spring 67 and the release valve spring 89 acting on the lower and upper ends, respectively, of the space levers 91. Upon movement of the plunger 93 toward the left the release valve 82 will be moved to its unseated position by the spring 88 to effect communication between the pressure chamber 59 and the atmosphere through passage 81, release valve chamber 80, passages 84, chamber 77 and the exhaust passage 78.

The release of fluid under pressure from the pressure chamber 59 of the brake valve device 6 also effects the release of fluid under pressure from the piston chamber 121 of the brake valve device 6 thus descreasing the pressure on the face of the piston 122 which is moved toward the left by the pressure in the valve chamber 125 and in the chamber 352, carrying the slide valve 124 with it until communication is effected between the slide valve chamber 125 and the atmosphere through the exhaust port 131 thus effecting the release of fluid under pressure from the brake cylinders 1 and 2 through the exhaust port 131 to release the brakes.

If the operator, after effecting the first pneumatic service application of the brakes as described above, wishes to make a further application of the brakes, the brake valve controller handle 29 is moved further from its release position. During movement of the controller handle 29 from the position indicated by the vertical dot and dash line 1 on Fig. 6 to the position indicated by the line 3, the portion of the face of the cam 32 that engages the lever 47 is of such shape that the lever 47 is not moved further in a brake applying direction but is retained in the position occupied when the controller handle 29 is in the position 1 of Fig. 6, thus maintaining the pneumatic brake applied with a brake cylinder pressure corresponding to that effected when the brake controller handle 29 is in position 1 of Fig. 6.

When the handle 29 of the brake controller 8 is moved to the position 2 on Fig. 6 the conducting segment 36 bridges the contact members 216 and 217, the conducting segment 34 bridges the contact members 234 and 235, and the conducting segment 33 bridges the contact members 354 and 355.

The controller segment 36, in this position, completes a circuit from the positive terminal of the battery 215 through conductor 324, contact members 217 and 216 and the conducting segment 36, conductor 356, through the winding of the magnet 200 of the track shoe raising magnet valve device 181, and by conductor 357 to the negative terminal of the battery 215, thus energizing the winding of the magnet 200 to move valve 206 to its seat. As the valve 206 is seated, communication from the piston chamber 202 of the relay valve device 182, through the exhaust port 208, is closed and the valve 212 is forced from its seat thus effecting communication from the main reservoir pipe 41, through valve chamber 213, the chamber 205, and the pipe 210, to the piston chamber 202 of the relay valve device 182. The supply of fluid under pressure to the piston chamber 202 causes the piston 203 to be moved upwardly. The piston stem 204 engages the valve stem 197 forcing the needle valve 199 to its seat to close communication from the main reservoir pipe 41 to the track shoe raising cylinders 183 through chambers 201, 192 and pipe 191, and forcing the valve 193 from its rib seat 194 to open communication from the cylinders 183 to the atmosphere through pipe 191, chambers 192 and 195, and the exhaust port 196. Upon the release of fluid under pressure from the piston chamber 185 of the track shoe raising cylinders 183, the track shoes 15, 16, 17 and 18 are moved downwardly by gravity into engagement with the rail 180.

In this position of the controller drum 27 a circuit is also completed from the junction point 358 of the motor circuit through conductor 359, the winding of the track brake line switch 223, conductor 361 to the junction point 362 and through conductor 363, contact member 238, conducting segment 34 and contact member 239 to ground at 364, and to the grounded terminal 337 of the motor circuit, thus impressing across the winding of the track brake line switch 223 the voltage or counter-electromotive force of the motor armatures 341 and 342 in series which, so long as the vehicle is in motion, will energize the winding of the line switch 223 to maintain it in its circuit closing position to close a circuit from the overhead trolley wire 219, through the trolley 221, conductor 222, the contact members of the line switch 223, conductor 224 to the contact member 354 on the brake controller 8. In the assumed, or first track brake applying position of the controller 8 this circuit is completed to ground through the conducting segment 33, the contact member 355 and the winding of the relay 225, thus actuating the relay 225 to its circuit closing position to complete a circuit from the conductor 224 through the contact members of the relay 225, the resistors 234, 235, 236, 237, and the conductor 231, through the windings of the track shoes 15 and 16 to ground at 232 and through the windings of the track shoes 17 and 18 to ground at 233. As the controller handle 29 is moved further from its release position the conducting segment 33 engages successively the conducting members 365, 366, 367 and 368 which complete circuits to ground through the windings of relays 226, 227, 228 and 229, respectively, shunting the resistors 234, 235, 236 and 237, respectively, from the circuit energizing the windings of the track shoes thus increasing the degree of energization of the track shoe magnets step by step. As the controller drum 27 is moved away from its release position and the several conducting contact members 355, 365, 366 and 367 have completed circuits for effecting the closing of their associated relays 225, 226, 227 and 228, these contact members are separated from the conducting segment 33, leaving only the lower relay 229 in its circuit closing position.

As the controller drum 27 is moved further away from its release position or from position 3 to position 5 on the diagram of Fig. 6, the magnetic track brake remains fully energized and the cam 32, which is so shaped that its outer face extends further from the shaft 28 as indicated by the upwardly sloping surface from position 3 to position 5 in the lower part of the diagram in Fig. 6, effects a further clockwise movement of the lever 47 about the pin 48 through the second pneumatic service application zone. This movement of the lever 47 effects a corresponding movement of the lever 51 and of the operating lever 101 of the brake valve device 6 to effect a further increase in pressure within the pressure chamber 59 and within the piston chamber 121 of the relay valve device 5 to effect a corresponding increase in the pressure within the brake cylinders 1 and 2.

When the controller drum 27 reaches position 4 on the diagram in Fig. 6, the conducting member 369 engages the conducting segment 35 completing a circuit from the positive terminal of the battery 215 through conductor 324, contact member 325, conducting segment 35, contact member 369, conductor 371, the winding of dynamic braking contactor 244, conductors 328 and 357 to the negative terminal of the battery 215 thus closing the dynamic braking contactor 244. The contactor 244, upon being energized, closes a dynamic braking circuit extending from the junction point 358 of the motor circuit through conductor 359, the contact of the dynamic braking contactor 244, the rheostat arm 372, the dynamic braking resistor 25 and conductor 373 to the junction point 374 of the motor circuit. I am aware that in dynamic braking systems of the character herein illustrated means is provided for automatically moving the rheostat arm 372 along the variable resistor 25 in such manner as to maintain the dynamic braking effect upon the motors 21, 22, 23 and 24 substantially constant while their speed, and consequently their counter-electromotive force is decreasing. Since, however, such mechanism forms no part of the present invention is it not illustrated or described.

An emergency operation of the brakes may be effected by placing the handle 29 in position 6 on the diagram in Fig. 6, in which position the cam 31 at the lower portion of the shaft 28 engages the valve stem 45 and moves the emergency valve 42 from its seat 44 against the bias of the spring 43, thus venting the safety control pipe 11 to the atmosphere past the valve seat 44 to apply the brakes in a manner to be later described.

If the operator wishes to release the brakes the brake controller handle 29 is moved to its release position, thus reversing the operation of the cams 31 and 32, described above, and interrupting the several circuits closed through conducting segments 33, 34, 35 and 36 of the controller drum 27 in the reverse order to that in which they were closed while the drum was moved to its brake applying position.

If the brakes are applied with the brake controller handle 29 in any service application position, and the rate of retardation of the vehicle becomes sufficient, the pendulum 140 of the retardation controller 12 will swing forward against the bias of the spring 149, pushing the plunger 142 toward the left to cause engagement between its outwardly extending flange 148 and the inwardly extending flange 153 of the sleeve 152, in which position the contact member 144 engages the contact member 145 completing a circuit from the positive terminal of the battery 215 through conductor 323, conductor 381, the contact members 144 and 145 of the retardation controller, conductor 382, to the winding of the magnet 168 in the magnet valve device 13, through conductors 383 and 357 to the negative terminal of the battery 215, thus energizing the winding of the magnet valve device 13 and causing the valve 171 to be forced downwardly against the bias of the spring 176 to close communication from the pressure chamber 59 of the brake valve device 6 to the piston chamber 121 of the relay valve device 5 through pipes 61 and 7, thus preventing a further increase in pressure within the piston chamber 121 of the relay valve device, and, consequently, a further increase in pressure within the brake cylinders 1 and 2.

If the rate of retardation of the vehicle is sufficiently greater than the desired value, the pendulum 140, acting against the plunger 142, forces the plunger 142 and the sleeve 152 to the left, against the bias of the springs 149 and 154, until the contact member 144 engages the contact member 146. Engagement of the contact members 144 and 146 completes a circuit from the positive terminal of the battery 215 through conductors 323, 381, contact members 144, 146, conductor 384, the winding of the magnet 169 in the magnet valve device 14, conductors 383 and 357 to the negative terminal of the battery 215, thus energizing the magnet of the magnet valve device 14 and forcing the release valve 177 downwardly from its seat to effect communication from piston chamber 121 of the relay valve device 5 to the atmosphere through the application and release pipe 7 and the exhaust port 178, to effect a decrease in the application of the brakes until the retardation controller pendulum 140 interrupts the circuit through the contact members 144 and 146. The setting of the retardation controller 12 may be adjusted, by adjusting the position of the lever 161 operating the cam 158 to effect a rotation of the lever 156 about the pivot pin 157 to press the cap 151 inwardly against the force of the spring 149 to effect a predetermined compression of the spring, thus requiring particular forces of the pendulum 140 against the plunger 142, to effect the operation of the magnet valve devices 13 and 14.

If, for any reason, the pressure in the safety control pipe 11 is lost, or substantially reduced, either by the braking of the pipe, or by the venting of fluid under pressure from the safety control pipe, which may be done either through the conductor's valve 248, through the foot valve device 246 and the controller handle device 245, or past the emergency valve 42 in the brake controller 8, an emergency operation of the brakes is effected through operation of the deadman's relay valve device 9, and operation of the automatic pressure switches 230, 240 and 218. Upon a reduction in pressure in the safety control pipe 11 the pressure in the chamber 133 above the piston valve 134 of the deadman's relay valve 9 will be correspondingly reduced, and the pressure below the valve 134 will force the valve from its seat thus venting the piston chamber 117 in the emergency portion of the brake valve device 6 through passage and pipe 118 and the exhaust port 138. The release of fluid under pressure to the atmosphere past the unseated valve 134 will take place at a much more rapid rate than fluid will be supplied to the pipe 118 from the main reservoir pipe 41 through the choke 119, thus permitting the pistons 116 and 107 together with the block 105 to be moved toward the left by the force of the spring 114.

As the block 105 moves toward the left the left hand end of the block engages the lower end of the operating lever 101 of the brake valve device 6 rotating it in a clockwise direction about the shaft 52 thus moving the plunger 93 toward the right and effecting the supply of fluid under pressure from the main reservoir pipe 41 to the pressure chamber 59 and to the piston chamber 121 of the relay valve device 5 to effect an application of the fluid pressure brakes in the manner above described. Upon movement of the piston 107 toward the left, to the opposite side of the choked port 111 from that illustrated in Fig. 4, the piston chamber of the sanding relay 110, which is normally in communication with the atmosphere through passage 109, choke 111, chamber 108 and the exhaust port 112, is connected to the pressure chamber 59 through the passage 109, effecting operation of the sanding valve relay 110.

The closing of the automatic pressure switch 218 completes a circuit from the positive terminal of the battery 215 through conductor 323, the contact members of the switch 218 and conductor 356, the winding of the track shoe raising magnet valve device 181, conductor 357 to the negative terminal of the battery 215 thus operating the valves 206 and 212 downwardly to effect a lowering of the track shoes into engagement with the rail in the manner described above under service application of the brake. The operation of the pressure controlled switch 230 to its circuit closing position completes a circuit from the junction point 358 of the motor circuit through conductor 359, the winding of the track brake line switch 223, conductor 361 to junction point 362, conductor 386 and the contact members of the pressure operated switch 230 to ground at 387, and to the grounded terminal 337 of the motor, thus applying the counter-electromotive force across the motors 23 and 24 to the winding of the track brake line switch 223 to cause it to operate to its circuit closing position and to remain in that position so long as the vehicle is in motion and the motors 23 and 24 are developing an appreciable counter-electromotive force. The closing of the automatic pressure switch 240 effects the completion of a circuit from the trolley 221 through the conductors of the track raising line switch 223, conductor 224, the contact members of the switch 240, conductor 385, the winding of the relay 229 to ground, thus energizing the winding of the relay 229 and causing it to operate to its circuit closing position. The closing of the relay 229 effects the energization of the winding of the track shoe magnet through conductor 231. The circuit completed through the track brake line switch 223 and the relay 229 effects a full energization of the track shoe magnet so long as the vehicle is in motion.

Upon a reduction in pressure in the safety control pipe 11 to effect an emergency application of the brakes, the pressure in the piston chamber 166 of the retardation controller 12 is correspondingly reduced permitting the spring 167 to move the piston 165 and the lever 162 to the right, thus increasing the compression of the spring 149 and the force of the plunger 142 against the pendulum 140. This increases the setting of the retardation controller to effect a rate of retardation of the vehicle during emergency application of the brakes that is greater than the rate of retardation effected during service application of the brakes. The increased setting of the retardation controller requires a greater force of inertia to be exerted by the pendulum 140 on the plunger 142 to cause engagement of the contact member 144 with the contact members 145 and 146.

Means for effecting a deadman application of the brakes comprises the controller handle device 245 and the foot valve device 246. If downward pressure is exerted on the handle 252 of the controller handle device 245, and on the foot pedal 274 of the foot valve device 246, urging these levers to their lower or illustrated positions, the chamber 271 of the foot valve device is charged by the flow of fluid under pressure from the safety control pipe 11, through chamber 277 of the cut-off valve device 247, past the unseated diaphragm valve 276, through chamber 278 and pipe 272 to the chamber 271. Since the lever 274 is in its lower position the diaphragm valve 268 is pressed against the seat rib 269 closing communication between chambers 271 and 267 in the foot valve device. The chamber 267 is charged from the main reservoir pipe 41 through chamber 266 of the pilot valve portion of the controller handle device 245 past the pilot valve 261 in its lower seated position through chamber 263 and pipe 265.

If the operator relieves the pressure on the lever 274 of the foot valve device while maintaining pressure on the handle 252 of the controller handle device the diaphragm valve 268 will be unseated thus connecting the pipe 272 to the pipe 265. Since both these pipes are charged to main reservoir pipe pressure this operation has no effect on the brake system. If, while maintaining pressure on the lever 274 of the foot valve device, pressure is released from the handle 252 of the controller handle device the pilot valve 261 will be moved upwardly to its upper seated position by action of the spring 256, which will move the pin 255 downwardly against the left hand end of the lever 257, thus venting the pipe 265 through chamber 263 and the exhaust port 264, and closing communication from the main reservoir pipe 41 to the pipe 265 through the pilot valve chamber 266. This action is also ineffective to vent the safety control pipe 11 since communication between the controller handle device 245 and the safety control pipe is closed by the foot valve device 246.

Should, however, the operator release pressure from both the foot valve lever 274 and the controller handle 252 at the same time, fluid would be vented from the safety control pipe 11, through chambers 277 and 278 of the cut-off valve device 247, through pipe 272, past the unseated valve 268 of the foot valve device, through pipe 265, the pilot valve chamber 263 and the exhaust port 264 to the atmosphere, thus effecting an emergency application of the brakes in the manner above described. As the brake cylinder pressure builds up, fluid under pressure flows from the brake cylinder pipe 126 to the chamber 287 in the cut-off valve device until the pressure below the valve 282 has become sufficient to move the valve upwardly to its upper seat 285 against the force of the spring 284, thus closing communication from the chamber 281 to the atmosphere and effecting a pressure within the chamber 281 corresponding to brake cylinder pressure to force the diaphragm 279 and the valve 276 downwardly to cut off communication between the safety control pipe 11 and the pipe 272. The cut-off valve device 247 is adjusted to operate to close communication between the safety control pipe 11 and the pipe 272 upon brake cylinder pressure corresponding to a moderate service application. The operator may, therefore, after effecting such a service application of the brakes, relieve pressure from both the handle 252 of the controller handle device and the lever 274 of the foot valve device without effecting an emergency application of the brakes.

The check valve device 273 prevents the venting of air from the safety control pipe 11 through the deadman devices including foot valve device 246 and the controller handle device 245 after the pressure in the brake cylinder pipe 126 has built up sufficiently to cause the diaphragm valve 276 of the cut-off valve device 247 to be forced to its seat, thus closing communication between the safety control pipe 11 and the pipe 272, while permitting the safety control pipe 11 to be charged with fluid under pressure from the main reservoir pipe 41 through chambers 266 and 263 in the pilot valve device, past pilot valve 261 when the handle 252 of the controller handle device 245 is in its lower position, through pipes 265 and 272 and check valve 273 when the diaphragm valve 268 of the foot valve device is unseated.

While one preferred embodiment of my invention has been illustrated and described it will be apparent to those skilled in the art that many modifications in the apparatus and circuits illustrated may be made within the spirit of my invention and I do not wish to be limited otherwise than by the scope of the appended claims.

Having now described my invention, what I claim as new and desire to secure by Letters Patent, is:

1. In a brake equipment for vehicles, in combination, a brake cylinder, an electric brake, manually operable means for controlling the supply of fluid under pressure to said brake cylinder and for controlling said electric brake, a retardation controller responsive to the rate of deceleration of the vehicle for regulating the degree of fluid pressure in said brake cylinder, and manually operable means independent of said brake controlling means for varying the setting of said retardation controller under service conditions.

2. In a braking equipment for vehicles, in combination, fluid pressure braking means, magnet track braking means, dynamic braking means, manual means for controlling the application and release of said several braking means and effective upon movement from its release position to effect in sequence a gradual application of the fluid pressure braking means to a predetermined value, a gradual application of the magnetic braking means, a further gradual application of the fluid pressure braking means, and an application of the dynamic braking means in the order named.

3. In a brake equipment for vehicles, in combination, fluid pressure braking means, magnetic track braking means, dynamic braking means, manually operable means for controlling the application of said several braking means and effective upon movement away from its release position to effect in sequence, a gradual application of the fluid pressure braking means to a predetermined value, a gradual application of the magnetic braking means, a gradual further application of the fluid pressure braking means, an application of the dynamic braking means, and an emergency application of said brakes.

4. In a brake equipment for vehicles, in combination, fluid pressure braking means, magnetic track braking means, dynamic braking means, manually operable means for controlling the application of said several braking means effective upon movement from its release position to effect a gradual application of the fluid pressure braking means to a predetermined value, a gradual application of the magnetic braking means, an application of the dynamic braking means, and an emergency application of said brakes in the order named.

5. In a brake equipment for vehicles, in combination, a fluid pressure braking means, magnetic track braking means, dynamic braking means, manually operable means for controlling the application and release of said several braking means and effective upon movement from its release position to effect a graduated application of the fluid pressure braking means to a predetermined value, a graduated application of the magnetic braking means, and an application of the dynamic braking means in the order named.

6. In a brake equipment for vehicles, in combination, a fluid pressure braking means, magnetic track braking means, dynamic braking means, manually operable means for controlling the application of said several braking means, effective upon movement from its release position to effect a gradual application of the fluid pressure braking means to a predetermined value, a gradual application of the magnetic braking means, a gradual further application of the fluid pressure braking means, and an application of the dynamic braking means in the order named, and a retardation controller responsive to the rate of deceleration of the vehicle for controlling the degree of application of said fluid pressure braking means.

7. In a brake equipment for vehicles arranged to be propelled by electric motors and having an electric controller for controlling the supply of power to the motors, in combination, a fluid pressure brake, an electric brake, manually operable brake controlling means for controlling the application and release of said fluid pressure brake and said electric brake, and means effective upon movement of said manually operable brake controlling means to any brake applying position for interrupting the flow of power to said electric motors independently of the position of the electric controller.

8. In a brake equipment for vehicles, in combination, a fluid pressure braking means, an electric braking means, manually operable means for controlling the application and release of said braking means, a safety control pipe normally charged with fluid under pressure, and a plurality of separate means associated respectively with each of said braking means and independently responsive to the release of fluid under pressure from said safety control pipe for effecting an emergency application of the brakes.

9. In a brake equipment for vehicles, in combination, a fluid pressure braking means, an electric braking means, manually operable means for controlling the application and release of said braking means, a safety control pipe normally charged with fluid under pressure, a plurality of means each independently responsive to the release of fluid under pressure from said safety control pipe for effecting an emergency application of the several braking means, and deadman devices subject to pressure by the operator and operative upon the release of such pressure for venting fluid under pressure from said safety control pipe.

10. In a brake equipment for vehicles, in combination, a fluid pressure braking means, an electric braking means, manually operable means for controlling the application and release of said braking means, a safety control pipe normally charged with fluid under pressure, means responsive to the venting of fluid under pressure from said safety control pipe for effecting an emergency application of the fluid pressure braking means, and a plurality of independent means separately responsive to the venting of fluid under pressure from said safety control pipe for effecting an emergency application of the electric braking means, deadman devices subject to pressure by the operator and operative upon the release of such pressure for venting fluid under pressure from the safety control pipe, and means effective upon a predetermined service application of the brakes for preventing the release of fluid under pressure from said safety control pipe through said deadman devices.

11. In a brake equipment for vehicles, in combination, a fluid pressure braking means, an electric braking means, manually operable means for controlling the application and release of said braking means, a safety control pipe normally charged with fluid under pressure, a plurality of separate means associated respectively with each of said braking means and independently responsive to the venting of fluid under pressure from said safety control pipe for effecting an emergency application of the brakes, and a plurality of means for effecting the release of fluid under pressure from said safety control pipe.

12. In a brake equipment for vehicles, in combination, a brake cylinder, an electric braking means, manually operable means for controlling the supply of fluid under pressure to said brake cylinder and for controlling the application and release of said electric braking means, a safety control pipe normally charged with fluid under pressure, means responsive to a reduction in safety control pipe pressure for causing fluid under pressure to be supplied to said brake cylinder to effect an emergency operation thereof, and an electric circuit closing means responsive to a reduction in safety control pipe pressure for effecting an emergency application of said electric braking means.

13. In a brake equipment for vehicles, in combination, a brake cylinder, an electric track shoe braking means, manually operable means for controlling the supply of fluid under pressure to said brake cylinder and the application and release of said track shoe braking means, a safety control pipe normally charged with fluid under pressure, means responsive to a reduction in safety control pipe pressure for effecting the supply of fluid under pressure to said brake cylinder, and electric circuit closing means responsive to a reduction in safety control pipe pressure for effecting an emergency application of said track shoe braking means, and means responsive to the stopping of the vehicle for automatically releasing said track shoe braking means.

14. In a braking equipment for vehicles, in combination, a fluid pressure braking means, an electrical braking means, manually operable means for controlling the application and release of said several braking means, a retardation controller responsive to the rate of deceleration of the vehicle for regulating the degree of application of said braking means, means manually operable at the will of the operator for adjusting the setting of said retardation controller, to effect a desired rate of retardation of the vehicle during service application of the brakes, and means automatically operable to vary the setting of said retardation controller to effect an increase in the rate of retardation of the vehicle upon an emergency application of the brakes.

15. In a braking equipment for vehicles, in combination, a brake cylinder, a magnetic track brake, manually operable means for controlling the supply of fluid under pressure to said brake cylinder and the degree of application and release of said track brake, a retardation controller responsive to the rate of deceleration of the vehicle for regulating the degree of fluid pressure in said brake cylinder, manual means operable at the will of the operator independently of the application of the brakes for adjusting the setting of said retardation controller to effect a desired rate of retardation of the vehicle during service application of the brakes, and means automatically operable to vary the setting of said retardation controller to effect an increase in the rate of retardation of the vehicle by a fixed amount upon an emergency operation of said brakes.

16. In a braking equipment for vehicles, in combination, a fluid pressure braking means, an electrically operated braking means, manually operable means for controlling the application and release of said several braking means, a retardation controller responsive to the rate of deceleration of the vehicle for regulating the degree of application of one of said braking means, a safety control pipe, and means effective upon a reduction in safety control pipe pressure for effecting an emergency operation of said brakes and for automatically increasing the rate of retardation of the vehicle permitted by said retardation controller by a fixed amount above its service rate of retardation.

17. In a braking equipment for vehicles, in combination, a fluid pressure braking means, a plurality of electrically energized braking means, manually operable means for controlling the application and release of said several braking means, and means responsive to the ceasing rotation of the vehicle wheels for releasing said electrically energized braking means independently of the operation of said manually operable means.

18. In a brake equipment for vehicles, in combination, fluid pressure braking means, magnetic track braking means, dynamic braking means, manually operable means for controlling the application of said several braking means and effective upon movement from its release position to effect an application of the dynamic braking means, a gradual application of the fluid pressure braking means, a gradual application of the magnetic braking means, and a gradual further application of the fluid pressure braking means, and a retardation controller responsive to the rate of deceleration of the vehicle for controlling the degree of application of said fluid pressure braking means.

19. In a brake equipment for vehicles, in combination, a fluid pressure braking means, magnetic track braking means, dynamic braking means, manually operable means for controlling the application of said several braking means effective upon movement from its release position to effect a gradual application of the fluid pressure braking means, a gradual application of the magnetic braking means, a gradual further application of the fluid pressure braking means, and an application of the dynamic braking means within the fluid pressure service application zone, and a retardation controller responsive to the rate of deceleration of the vehicles for controlling the degree of application of said fluid pressure braking means.

20. In a brake equipment for vehicles, in combination, a fluid pressure braking means, magnetic track braking means, manually operable means for controlling the application of said several braking means effective upon movement from its release position to effect a gradual application of the fluid pressure braking means, a gradual application of the magnetic braking means, and a gradual further application of the fluid pressure braking means, and a retardation controller responsive to the rate of deceleration of the vehicle for controlling the degree of application of said fluid pressure braking means.

21. In a brake equipment for vehicles, in combination, a fluid pressure braking means, magnetic track braking means, manually operable means for controlling the application of said several braking means effective upon movement from its release position to effect a gradual application of the fluid pressure braking means and a gradual application of the magnetic braking means, said magnetic braking means being arranged to be applied in a series of steps, the first step occurring substantially after the initial application of said fluid pressure braking means and the last step occurring substantially prior to the completion of the application of the fluid pressure braking means, and a retardation controller responsive to the rate of deceleration of the vehicle for controlling the degree of application of said fluid pressure braking means.

22. In a braking equipment for vehicles, in combination, a fluid pressure braking means, an electrically energized track shoe braking means, a dynamic braking means, manually operable means for controlling the application and release of the several braking means, and means responsive to a decrease in the rotation of the vehicle wheels to a predetermined value for interrupting the energization of said track shoe braking means independently of the operation of said manually operable means.

23. In a braking equipment for vehicles, in combination, a fluid pressure braking means, an electrically energized track shoe braking means, electric generator braking means for applying a braking force to the vehicle wheels, manually operable means for controlling the application and release of the several braking means, and means responsive to the decrease in the braking force of said generator braking means to a predetermined value for interrupting the energization of said track shoe braking means independently of the operation of the said manually operable means.

24. In a vehicle brake system, in combination, a magnetic track brake device normally suspended above a track rail, a pipe normally charged with fluid under pressure, automatic control switch means connected to said pipe and having associated contacts adapted to be operated when the pressure in said pipe is diminished, means responsive to operation of certain of said contacts for effecting a supply of current to said track brake device, and means responsive to operation of other of said contacts for effecting lowering of said track brake device to engagement with the track rail.

25. In a vehicle brake system, in combination, a magnetic track brake device adapted to be normally suspended above a track rail, a circuit for supplying current to energize the track brake device, a resistance in said circuit, a pipe normally charged with fluid under pressure, three automatic control switch devices connected to said pipe each of which is adapted to close contacts therein when pressure in said pipe is diminished, means responsive to the closing of the contacts in one of said switch devices for connecting said circuit to a source of current supply, means responsive to the closing of the contacts in another of said switch devices for effecting shunting of said resistance in said circuit, and means responsive to the closing of the contacts in the last of said switch devices for effecting lowering of said track brake device to engagement with the track rail.

26. In a vehicle brake system, in combination, a magnetic track brake device, fluid pressure operated means adapted when fluid under pressure is supplied thereto for holding said track brake device suspended above a track rail, a pipe normally charged with fluid under pressure, a switch device connected to said pipe and having contacts therein adapted to be operated when the pressure in said pipe is diminished, and means responsive to said operation of said contacts for releasing fluid under pressure in said fluid pressure operated means.

27. In a vehicle brake system, in combination, a magnetic track brake device, fluid pressure operated means adapted when fluid under pressure is supplied thereto to maintain said track brake device suspended above a track rail, and adapted when fluid under pressure is released therefrom to permit said track brake device to drop by gravity to engagement with the track rail, a pipe normally charged with fluid under pressure, a first and a second switch device connected to said pipe, each of said switch devices having contacts therein adapted to be operated when the pressure in said pipe is diminished, means responsive to the operation of the contacts in said first switch device for effecting a release of fluid under pressure from said fluid pressure operated means, and means responsive to the operation of the contacts in said second switch device for effecting a supply of current to said track brake device.

28. In a vehicle brake system, in combination, a magnetic track brake device, fluid pressure operated means adapted when fluid under pressure is supplied thereto to maintain said track brake device suspended above a track rail, a magnet valve device adapted when current is supplied thereto to effect a release of fluid under pressure from said fluid pressure operated means, a pipe normally charged with fluid under pressure, and a switch device connected to said pipe for controlling the supply of current to said magnet valve device.

29. In a vehicle brake system, in combination, a magnetic track brake device, fluid pressure operated means adapted when fluid under pressure is supplied thereto for holding said track brake device suspended above the track rail, a pipe normally charged with fluid under pressure, and means responsive to a reduction in pressure in said pipe for releasing fluid under pressure from said fluid pressure operated means and for causing the energization of said track shoe to effect an emergency application of said magnetic track shoe braking means.

ELLIS E. HEWITT.